(12) United States Patent
Leslie et al.

(10) Patent No.: US 7,248,575 B2
(45) Date of Patent: Jul. 24, 2007

(54) COMMUNICATIONS ENGINE ARCHITECTURE

(75) Inventors: William Leslie, Santa Clara, CA (US); Marcelo San Martin, Alviso, CA (US); Carrie Karnos, Palo Alto, CA (US); Chad Stalsworth, Arroyo Grande, CA (US); Dave Terry, Kennesaw, GA (US); Sekhar Banerjee, Santa Clara, CA (US)

(73) Assignee: Longboard, Inc., Santa Clara, CA (US)

( * ) Notice: Subject to any disclaimer, the term of this patent is extended or adjusted under 35 U.S.C. 154(b) by 1083 days.

(21) Appl. No.: 10/232,094

(22) Filed: Aug. 29, 2002

(65) Prior Publication Data

US 2003/0063623 A1 Apr. 3, 2003

Related U.S. Application Data

(60) Provisional application No. 60/316,709, filed on Aug. 31, 2001.

(51) Int. Cl.
*H04L 12/66* (2006.01)
*H04L 12/28* (2006.01)
*H04L 12/56* (2006.01)

(52) U.S. Cl. .................. 370/352; 370/401; 370/411
(58) Field of Classification Search ................ None
See application file for complete search history.

(56) References Cited

U.S. PATENT DOCUMENTS

| | | |
|---|---|---|
| 5,276,899 A | 1/1994 | Neches |
| 6,104,289 A | 8/2000 | Rand |
| 6,513,129 B1 * | 1/2003 | Tentij et al. ................ 714/4 |
| 6,678,735 B1 * | 1/2004 | Orton et al. ................ 709/230 |
| 6,721,284 B1 * | 4/2004 | Mottishaw et al. ......... 370/255 |
| 6,965,614 B1 * | 11/2005 | Osterhout et al. .......... 370/466 |
| 2001/0046234 A1 * | 11/2001 | Agrawal et al. ............ 370/402 |
| 2002/0018464 A1 * | 2/2002 | Kikinis ........................ 370/352 |
| 2002/0188744 A1 * | 12/2002 | Mani ........................... 709/231 |
| 2003/0018619 A1 * | 1/2003 | Bae et al. ..................... 707/3 |
| 2003/0061428 A1 | 3/2003 | Garney et al. |
| 2006/0098619 A1 * | 5/2006 | Nix et al. ..................... 370/352 |
| 2007/0008958 A1 * | 1/2007 | Clemm et al. .............. 370/352 |

\* cited by examiner

*Primary Examiner*—Wing Chan
*Assistant Examiner*—Warner Wong
(74) *Attorney, Agent, or Firm*—Duane Morris LLP

(57) ABSTRACT

A modular communications platform and method for processing a communications command are described. The communications platform provides an infrastructure for telephony service providers. The platform includes a connection logic control module for supporting network services, a service logic control module for providing call control support, a subscriber and policy service module to respond to subscriber and policy requests, and an FCAPS module to execute fault, configuration, accounting, performance, and security functions. The method can include the steps of receiving a communications command, generating an authentication request, generating an approval to the authentication request if the communications command is from an approved source, generating a billing request, generating a CPL script, generating instructions based on the CPL script, processing the instructions, generating a status report, and processing the billing request and a status report.

58 Claims, 8 Drawing Sheets

COMMUNICATIONS ENGINE ARCHITECTURE

CROSS REFERENCES TO RELATED APPLICATIONS

The present application claims priority of Provisional Patent Application Ser. No. 60/316,709, filed Aug. 31, 2001 and entitled "Communications Engine Architecture," which is incorporated herein by reference in its entirety.

BACKGROUND OF THE INVENTION

1) Field of the Invention

The invention relates generally to telecommunications, and more particularly to a modular software architecture.

2) Description of Background Art

FIG. 1 is a diagram of a communications network 100 according to the prior art. The communications network 100 includes a public switch telephone network (PSTN) 110 coupled to an Internet Protocol (IP) network 120 by a media gateway controller and media gateway (MGC/MGW) 130. The communications network 100 also includes a plurality of integrated access devices (IAD) 140, a plurality of computers 160, and a plurality of Session Initiation Protocol (SIP) telephones 170 coupled to the IP network 120. Additional conventional telephones 150 and computers 160 may be coupled to each IAD 140.

PSTN 110 can be, for example, a conventional switchboard station for connecting conventional telephones 150 to allow parties to make telephone calls and transmit voice and other data. IP network 120 is a network, such as the Internet, that is capable of transmitting electronic data packets in any of a number of forms and that can provide access to a variety of Internet services. The PSTN 110 is accessed directly with conventional telephones 150, and the IP network 120 can also be accessed directly through specially designed computers 160 and SIP telephones 170. The IP network 120 can also be indirectly accessed with conventional telephones 150 and computers 160 through IAD 140 which serves as an intermediary.

MGC/MGW 130 merges the two networks 110 and 120 by providing a translation mechanism that allows for the transfer of information between the two networks 110 and 120. Traditional MGC/MGW 130 architecture uses circuit switches to provide the translation mechanism. Typically, however, implementing circuit switches in an MGC/MGW 130 architecture has required being dependent on a single vendor for software, hardware, and applications in one proprietary package. Customizing an MGC/MGW 130 architecture of circuit switches is, therefore, frequently slow and expensive.

An alternative MGC/MGW 130 architecture employs a softswitch, an open-standard software solution to network integration. Specialized protocols such as SIP, Signaling System Number 7 ("SS7") and Call Processing Language ("CPL") have evolved in order to provide optimal control of intrinsic features in softswitch-based MGC/MGW 130 architectures. Because these protocols are specialized, however, using them generally can be cumbersome.

Despite the availability of softswitches, many functions such as account management, billing, call forwarding, etc. remain based on PSTN 110, limiting the flexibility of the network. What is needed is a system that can overcome the disadvantages in the prior art.

SUMMARY OF THE INVENTION

The invention provides a communications platform that uses modular software architecture to provide an infrastructure for telecommunications service providers. The communications platform includes a connection logic control module, a service logic control module, a subscriber and policy service module, and a fault, configuration, accounting, performance, and security (FCAPS) module. Additionally, embodiments of the communications device can also include one or more satellite processors to facilitate communications between the various modules. The satellite processors can be configured to allow a subset of the four described modules to function without the presence of the missing modules.

Accordingly, various embodiments of the invention can be assembled from sub-combinations of the four independent modules. For example, a proxy server can be produced from only the connection logic control module. In other embodiments the connection logic control module together with the subscriber and policy service module form a registration server. In still other embodiments the connection logic control module together with the subscriber and policy service module and the service logic control module the form a location server. In yet other embodiments the connection logic control module together with the the service logic control module and the FCAPS module form a SIP portal.

The connection logic control module provides support for network services. Network services include receiving commands, executing call logic, and generating requests to the service logic control, subscriber and policy service, and FCAPS modules. The service logic control module provides call control support in response to requests from the connection logic control module. This includes executing call processing language scripts. The subscriber and policy service module responds to subscriber and policy service requests from any module requesting information stored in external databases. In some embodiments the subscriber and policy service module is capable of interpreting generalized database requests and accessing multiple directories in order to find the correct directory and carry out the request. Finally, the FCAPS module can execute fault, configuration, accounting, performance, and security functions in response to an FCAPS request. Local satellite processors are used to facilitate communication between modules.

The connection logic control module includes a SIP protocol driver connected to a SIP proxy engine. The SIP protocol driver provides connection control for SIP devices and converts SIP messages from text format to SIP objects. The SIP proxy engine executes call logic and is connected to a QoS policy manager, a gate controller, and a transaction state manager. The QoS policy manager processes Quality of Service functions, the gate controller provides security though firewalls and proxy functions, and the transaction state manager maintains transaction records.

The service logic control module includes Parlay interfaces and a location service engine. The Parlay interfaces are connected with the SIP proxy engine and map the Parlay API specification onto the SIP transaction model while the location service engine, also connected to the SIP proxy engine, locates an address of a destination party and maintains call/session states. In one embodiment, the location service engine is also connected to a directory service module.

The subscriber and policy service module includes a subscriber database, a locator module connected to the subscriber database and the SIP proxy engine and that is capable of accessing and updating information in the subscriber database. The subscriber and policy service module also includes a directory service module connected with the SIP proxy engine that allows database interaction, and an authentication module connected with the SIP proxy engine that accepts authorization requests.

The FCAPS module includes a log server connected to the transaction state manager. The log server gathers and sorts performance and alarm data. The FCAPS module also includes an element manager object server connected to the log server and the directory service module. Further, an element manager craft client and interface, connected to the element manager object server, allows personnel to configure, diagnose, manually provision, and monitor the system.

The invention also includes a method of processing a communication request. The method includes the steps of receiving the communication request though a connection logic control module, generating an authentication request in the connection logic control in response to the communication request, generating an approval to the authentication request in a subscriber and policy service module if the communication command was generated by an approved source, generating a billing request in the connection logic control module in response to the approval, generating a CPL script in the connection logic control module in response to the communication command and its approval, generating instructions in the service logic control module based on the CPL script, processing instructions and generating a status report in the connection logic control module, and processing the billing request and the status report in the FCAPS module.

DETAILED DESCRIPTION OF THE INVENTION

Figure 2:
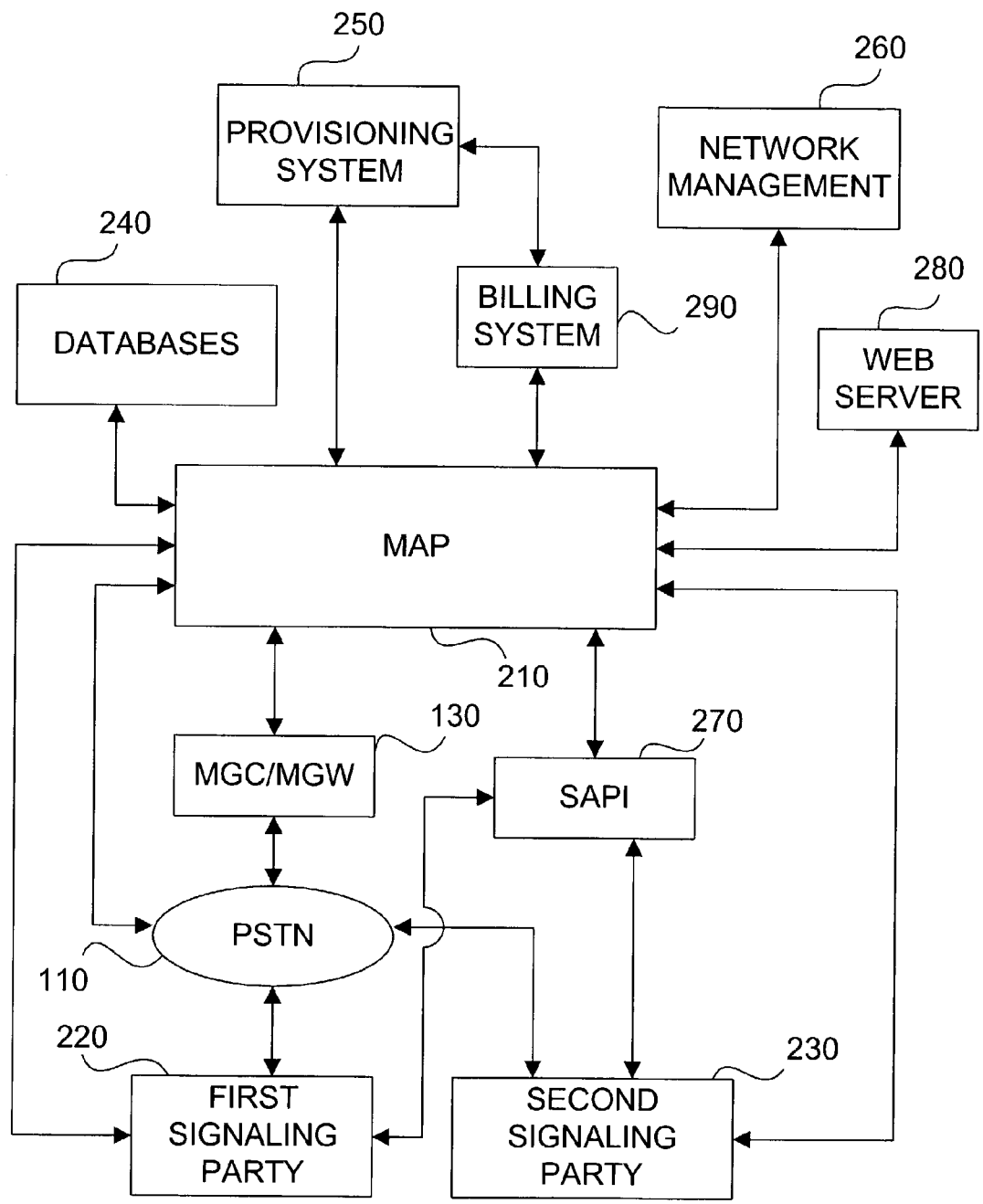
FIG. 2 is a block diagram showing a multi-engine application platform interacting with external systems.

FIG. 2 is a block diagram that shows interactions between a multiengine application platform (MAP) 210 and a variety of other systems. MAP 210 provides an infrastructure for telephony service providers that is a highly reliable, massively scalable IP-centric architecture that combines aspects of traditional telephony, IP transport and emerging Internet multimedia applications. Enhanced services that are not available through a PSTN 110 based architecture can include unified messaging, web-based interactive voice response (IVR), multimedia voice/data/fax/video support, fixed rate pricing, leveraging of wireless and wireline services, sophisticated fraud and policy control mechanisms, and efficient management of the underlying information and services.

The interactions shown in FIG. 2 can include communications between MAP 210 and a first signaling party 220, a second signaling party 230, databases 240, a provisioning system 250, a network management system 260, a subscriber application program interface (SAPI) 270, a web server 280, a billing system 290, MGC/MGW 130, and PSTN 110.

Figure 1:
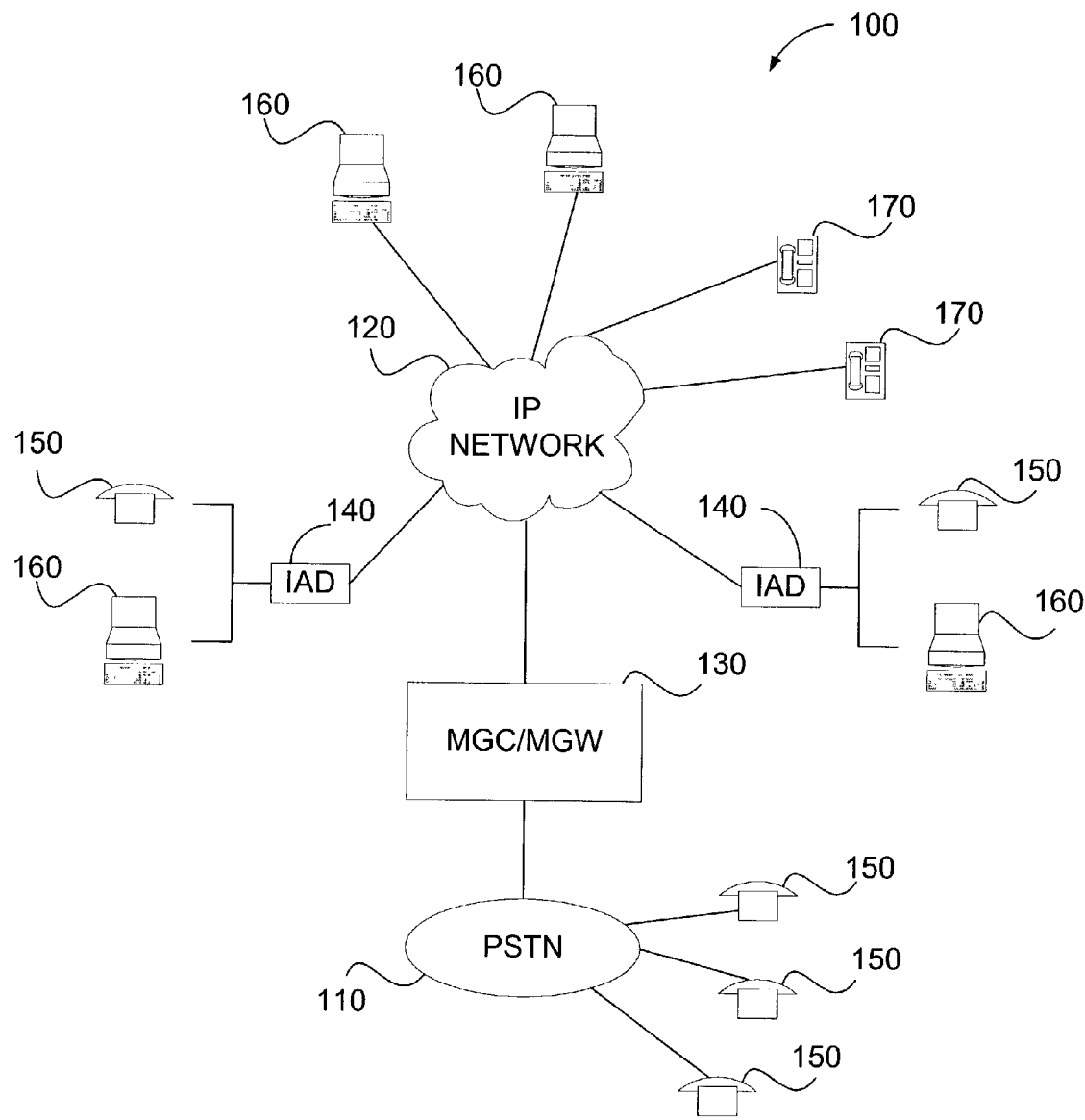
FIG. 1 is a prior art diagram of an existing communications network.

Although both of the first signaling party 220 and second signaling party 230 are shown with connections to PSTN 110, SAPI 270, and MAP 210, a signaling party can have fewer than these connections. For example, a direct connection to MAP 210 can be made if the signaling party includes IAD 140, computer 160 or SIP telephone 170 of FIG. 1. Thus, a signaling party using a conventional telephone 150 will indirectly access MAP 210 through PSTN 110 and MGC/MGW 130. Additionally, in some embodiments only the customers of a MAP 210 provider will have access to SAPI 270 to provide a client interface and access to features such as call forwarding. TAPI 3.0 provided by Microsoft, Inc. is an example of a commercially available product that can be used to create a custom SAPI 270. Similarly, in some embodiments only the customers of the MAP 210 provider have access to web server 280 to allow, for example, account review and modifications to be made over the Internet. An example of a free web server 280 that can be used with MAP 210 is Apache by The Apache Group.

Provisioning system 250 is an intermediary system that can be used by MAP 210 to provide customer services, log transactions, carry out requests, update files and like functions. An example of a commercially available provisioning system 250 is M/5 provided by MetaSolv, Inc. In some embodiments provisioning system 250 can interact with billing system 290 to facilitate accounting. An example of a commercially available billing system 290 is Arbor®/BP by Lucent, Inc.

Network management system 260 provides protocols necessary to communicate with external devices (not shown) and databases 240. HP OpenView by Hewlett-Packard, Inc. is an example of a commercially available network management system 260, and Netscape Directory Server by Netscape Corporation is an example of a database 240.

MAP 210 can be developed much more quickly then if the combination of commercially available components were each independently developed. In one embodiment, databases 240, provisioning system 250, network management system 260, SAPI 270, web server 280, billing program 290, and MGC/MGW 130 are realized by using existing known products. The development time of MAP 210 is further reduced by using a layered architecture. Various modules are used that are separated according to functionality. Since each module accomplishes a discrete function, multiple modules are required to process a single call.

Figure 3:
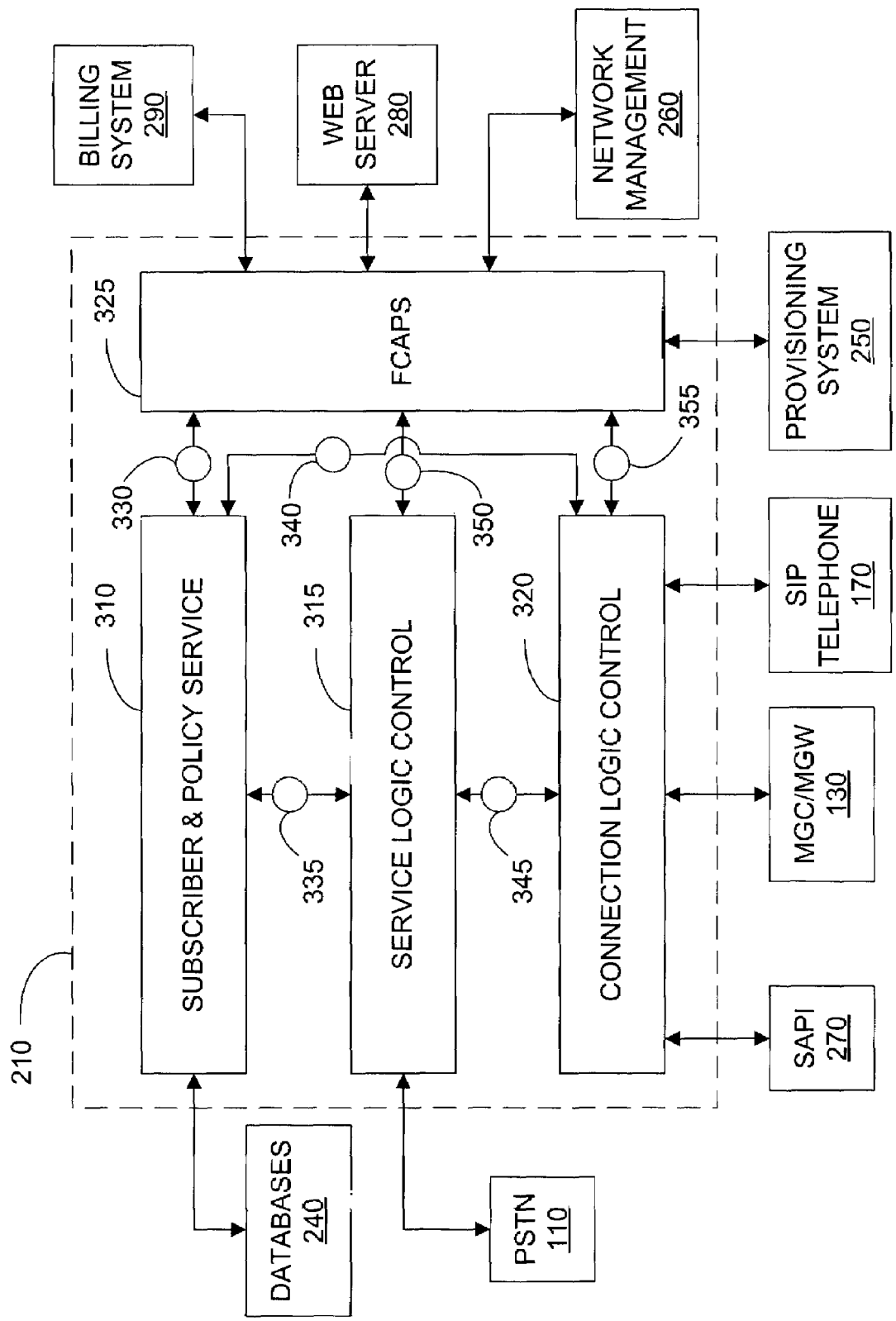
FIG. 3 is a block diagram showing the architecture of the multi-engine application platform.

FIG. 3 is a block diagram of an exemplary MAP 210 architecture in accordance with a specific embodiment. MAP 210 includes a subscriber and policy service module 310, a service logic control module 315, a connection logic control module 320, a fault, configuration, accounting, performance and security module (FCAPS) 325, and local satellite processors 330, 335, 340, 345, 350, and 355. The local satellite processors can be implemented in hardware, software and/or a combination thereof. MAP 210 architecture is preferably designed to have distributed control intelligence in order to meet the reliability of PSTN 110 based systems. Distributed control makes the system less communication intensive and less vulnerable to failure.

Connection logic control module ("CLC") 320 provides support for network services such as connection management, signaling, quality of service policy (QoS), access control and MGC/MGWs, as is further discussed in conjunction with FIG. 4 below. Service logic control module 315 provides support for call control, call features (such as *69), and inbound and outbound call management via Call Processing Language (CPL) for e-mail, paging and like services, as is further discussed in conjunction with FIG. 5 below. Subscriber and policy service module 310 performs call routing, SIP address translation, user name and password authentication, and directory services, as is further discussed in conjunction with FIG. 6 below. FCAPS 325 provides all operational support system interfaces, as is further discussed in conjunction with FIG. 7 below. Local satellite processors 330, 335, 340, 345, 350, and 355 allow derivative devices to be used and further reduce development time, as is discussed in connection with FIG. 8 below.

Referring again to FIG. 2, in some embodiments MAP 210 facilitates a connection between first signaling party 220 and second signaling party 230. First signaling party 220 can be connect though SAPI 270, MGC/MGW 130, or SIP telephone 170. Returning to FIG. 3, when first signaling party 220 requests a connection to second signaling party 230, MAP 210 receives an IP signal through connection logic control module 320. Connection logic control module 320 then sends a request to FCAPS 325 for authorization to proceed and initiate billing procedures. In response to the authorization request, FCAPS 325 initiates a request to subscriber and policy service module 310 to both identify and locate the first signaling party and the second signaling party. Once subscriber and policy service module 310 accesses the appropriate databases 240 and returns the information to FCAPS 325, FCAPS returns an authorization to connection logic control module 320. Connection logic control module 320 then relays the information to service logic control module 315, which either directly performs the tasks necessary to appropriately signal and connect both parties 220 and 230, or makes a request to an external system to accomplish the necessary tasks.

Figure 4:
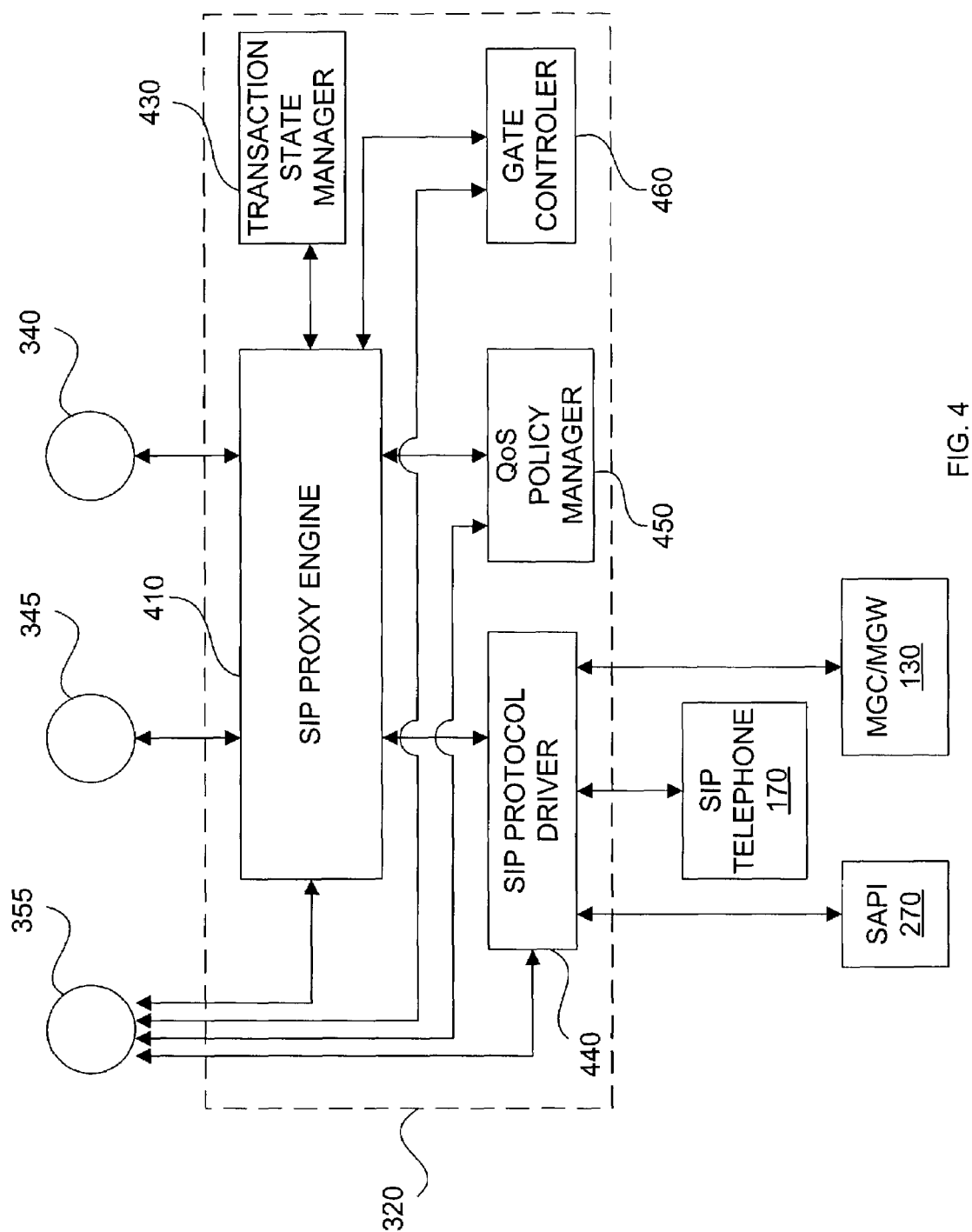
FIG. 4 is a block diagram showing the architecture of a connection logic control module.

FIG. 4 is a block diagram showing the architecture of the connection logic control module 320 for providing support for network services. Connection logic control module 320 includes a SIP proxy engine 410, a transaction state manager 430, a SIP protocol driver 440, a QoS policy manager 450 and a gate controller 460.

SIP protocol driver 440 provides connection control for SIP devices (such as SAPI 270, SIP telephone 170 and MGC/MGW 130) and other SIP servers, preferably accepting and establishing connections in either Transmission Control Protocol (TCP), User Datagram Protocol (UDP) or other equivalent protocols. When SIP protocol driver 440 receives a SIP message, it converts the SIP message from text format to a SIP object.

After receiving the SIP object from SIP protocol driver 440, SIP proxy engine 410 carries out the command by executing the appropriate call logic. For example, when an "invite" message from a caller is received, the SIP proxy engine 410 sends a request for authorization to the subscriber and policy service module 310, passes on the "invite" message from the caller to the service logic control module 315 if the caller is authorized, initiates a new "invite" message to the intended call recipient, informs the caller when the recipient's phone is ringing, terminates the call when appropriate, and stores the transaction records in transaction state manager 430. Transaction state manager 430 includes a database of transaction records and a database management system.

In some embodiments QoS policy manager 450 is configured to implement the QoS policy decision point (PDP) requirements of the Internet Engineering Task Force (IETF). The IETF has defined through the PDP requirements how certain levels of QoS should be processed depending upon the specifics of either a connection or by the session description part (SDP) of a SIP message.

Gate controller 460 provides security through firewalls and proxy functions, determining whether to allow or deny a connection. A firewall is typically used to separate a secured network from an unsecured network such as the public Internet. If a call recipient resides on the secured side of a firewall, certain security protocols may be required. When possible, gate controller 460 provides the necessary security protocols to the call recipient.

As shown in FIG. 3, connection logic control module 320 is coupled to FCAPS 325 by local satellite processor 355 that acts as an intermediary therebetween, as will be discussed further in connection with FIG. 8. From within connection logic control module 320 the SIP proxy engine 410, SIP protocol driver 440, QoS policy manager 450, and gate controller 460 each obtain required configuration parameters from FCAPS 325 in order to function. Additionally, components 410, 440, 450, and 460 send performance, alarm, and log records to FCAPS 325. In a similar fashion, when SIP proxy engine 410 requires participation from subscriber and policy service module 310 or service logic control module 315, communication takes place through intermediary local satellite processors 345 and 340.

Returning to FIG. 3, the connection logic control module 320 interacts with PSTN 110 through MGC/MGW 130 to receive and interpret electronic signals representing one or more states of communication, such as "off hook," "digits of keyboard," "on hook," or the like. Alternatively, the first signaling party 220 can avoid the PSTN all together and connect directly to connection logic control module 320 by using an IAD 140 or SIP telephone 170. Although a call from first signaling party 220 will typically come through connection logic control module 320, as described, some embodiments of the invention also allow service logic control module 315 to connect to PSTN 110, for example, through an extended signaling system 7 (SS7) network implementing SIP for telephones (SIP-T). In order to connect to PSTN 110 service logic control module 315 acts as a service control point (SCP), the element that provides call routing and enhanced services within PSTN 110.

It should be noted that although the various components have been functionally separated, it will be apparent to one skilled in the art that the various components can be further subdivided or combined into fewer, or even a single, component. Such simple alterations are considered to be within the scope of the described invention.

Figure 5:
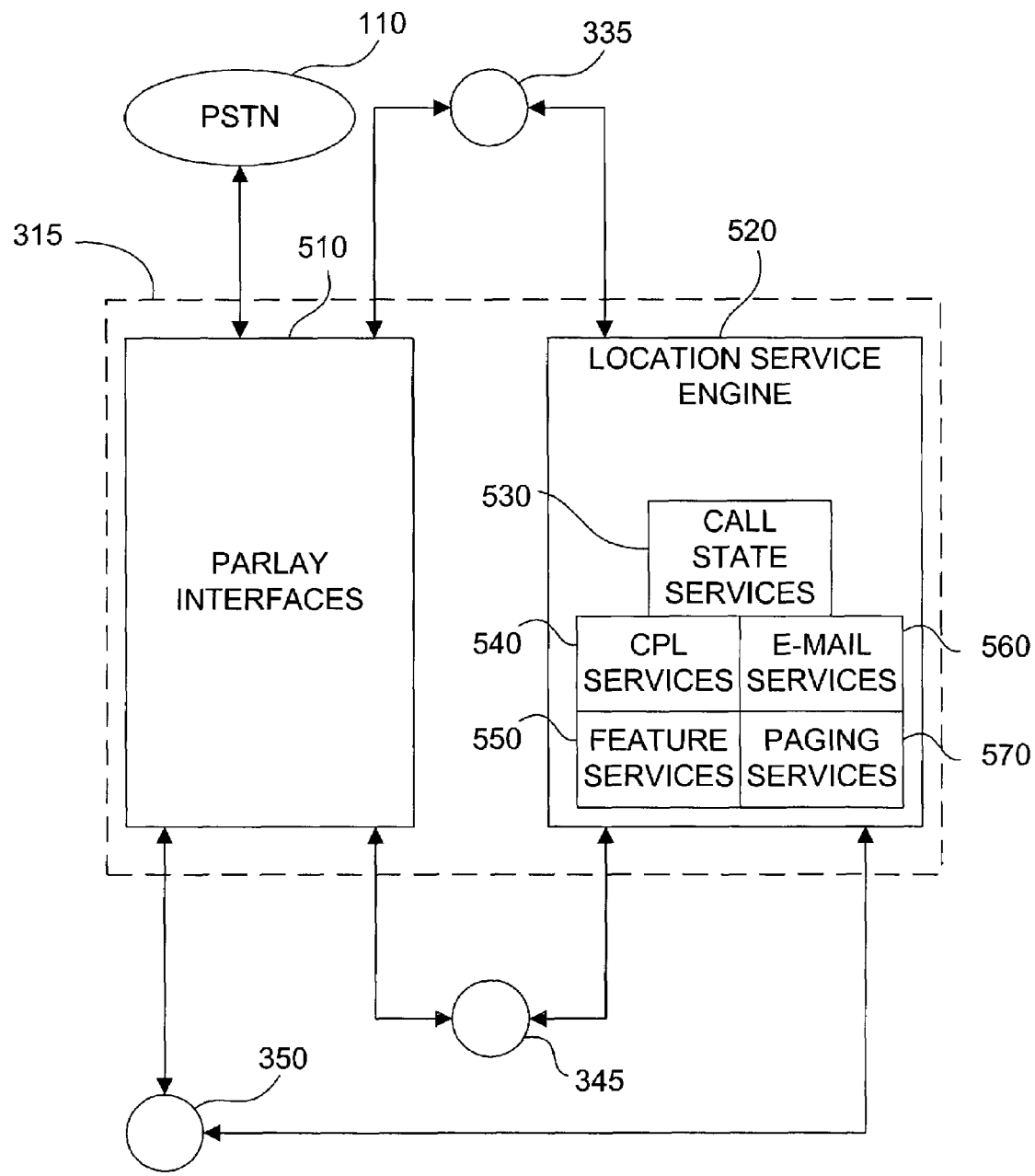
FIG. 5 is a block diagram showing the architecture of a service logic control module.

FIG. 5 is a block diagram showing service logic control ("SLC") module 315 architecture which includes Parlay interfaces 510 and a location service engine 520. The Parlay interfaces 510 map the Parlay API Specification (an open standard application programming interface for service capabilities such as call control, messaging, and security) onto the SIP transaction model. Location service engine 520 can include a call state services subsystem 530, a CPL services subsystem 540, a feature services subsystem 550, an e-mail services subsystem 560, and a paging services subsystem 570, as will be discussed below.

Location service engine 520 first attempts to locate an address of a destination party after receiving an "invite" message from connection logic control module 320 and then maintains the session states. Location service engine 520 can locate the address through a variety of services, including but not limited to, DNS location, routing tables (such as tables for E.164 numbered addresses), current mobility data from databases 240, feature based mapping (such as *69), and CPL interpretation.

Location service engine 520 can be designed in many different ways. For example, the engine 520 can be made up of many state machines, java scripts, or CGI scripts where each state machine, java script or CGI script handles one individual transaction (SIP message). An individual transaction is executed according to the rules established in a CPL services subsystem 540. The state information which must be maintained for the duration of each session is held in the call state services subsystem 530.

In some embodiments location service engine 520 includes the feature services subsystem 550 to provide support for call feature codes that are not recognizable as caller addresses, such as *69. Location service engine 520 can also include the e-mail services subsystem 560 to provide support for e-mail notifications, and the paging services subsystem 570 to provide support for paging notifications. Location service engine 520 can therefore accommodate detailed schedules and services to provide, for example, a beeper number for weekends, a cell phone number for lunch time, and a branch office number for every other Tuesday, and a report of each incoming call sent to a particular e-mail address. Additional subsystems can be added to allow, for example, the location service engine 520 to act as a SIP portal to other external services that are accessed with SIP.

Figure 6:
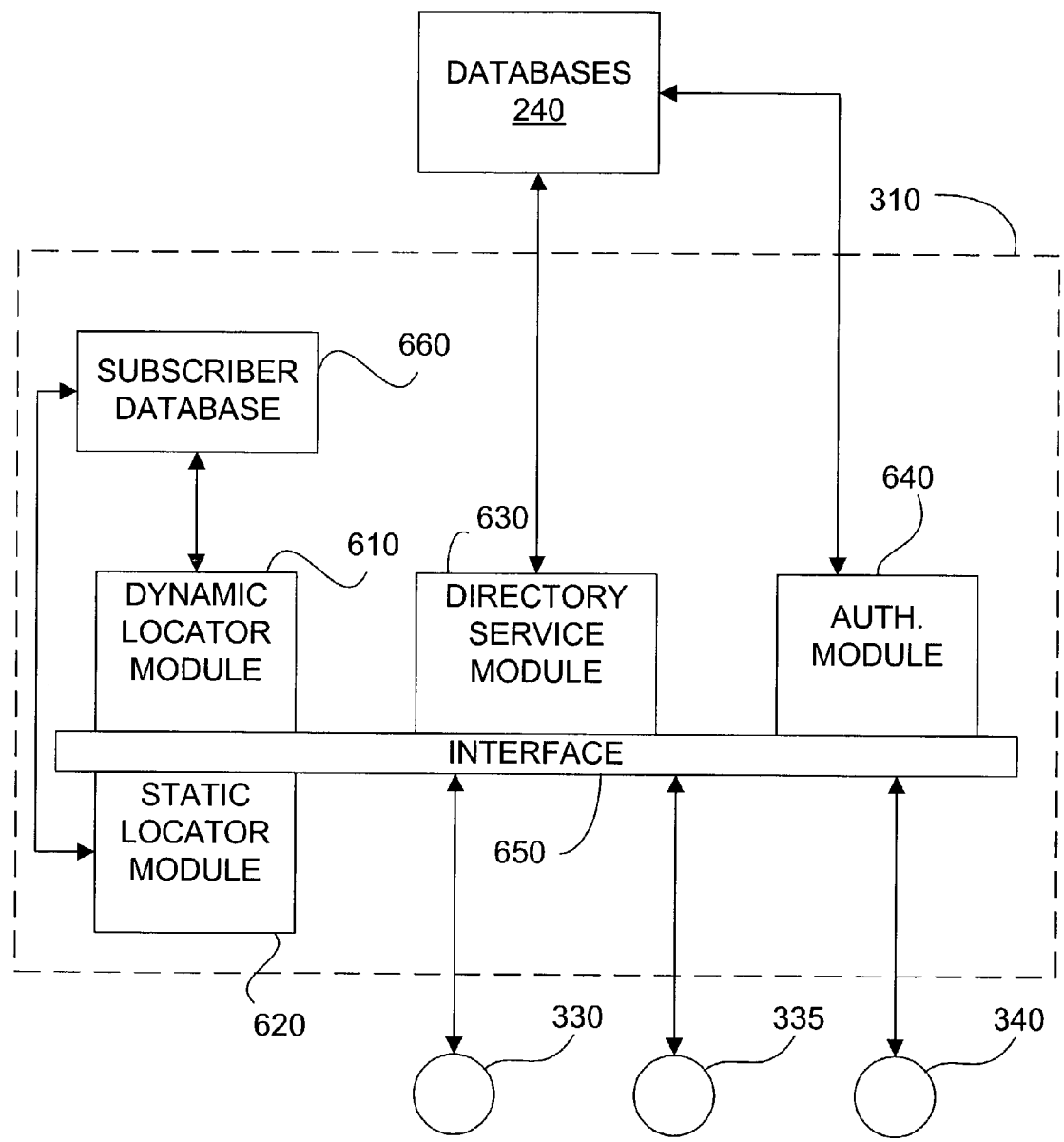
FIG. 6 is a block diagram showing the architecture of a subscriber and policy server module.

FIG. 6 is a block diagram of subscriber and policy service ("SPS") module 310 including a dynamic locator module 610, a static locator module 620, a directory service module 630, an authentication module 640, an interface module 650, and a subscriber database 660. Subscriber information stored in subscriber database 660 is updated by both dynamic locator module 610 and static locator module 620, depending on how frequently the information is subject to be changed. For example, information such the location of a party at a particular time, which is likely to change several times per day, is updated by dynamic locator module 610. On the other hand, infrequently altered information, such as a local number portability (LNP) or a client mailing address, is updated by static locator module 620. Although dynamic locator module 610 and static locator module 620 are combined into a single module in some embodiments, the design considerations are different enough that separate modules are preferred.

Directory service module 630 is coupled to databases 240 and allows updates, searches, and lookups, as well as basic directory operations, and in preferred embodiments is configured to do so independently of the method of storage employed by the databases 240. If directory service module 630 is configured to use, for example, a Lightweight Directory Access Protocol (LDAP) for accessing directories, the directory service module 630 would be limited in its ability to use databases and cache in order to support high frequency updates.

Authentication module 640 is also coupled to databases 240 and is configured to accept authentication requests and to verify the identity of at least one of the signaling party 220 or 230. Authentication can be accomplished with a wide variety of protocols ranging from the simplest username/password combinations to more advanced protocols such as the Secure Sockets Layer Protocol (SSL), the Transport Layer Security Protocol (TLS), or like protocols.

Interface module 650 is a shared interface. Interface module 650 couples modules 610, 620, 630, and 640 to local satellite processors 330, 335, and 340, as shown.

Figure 7:
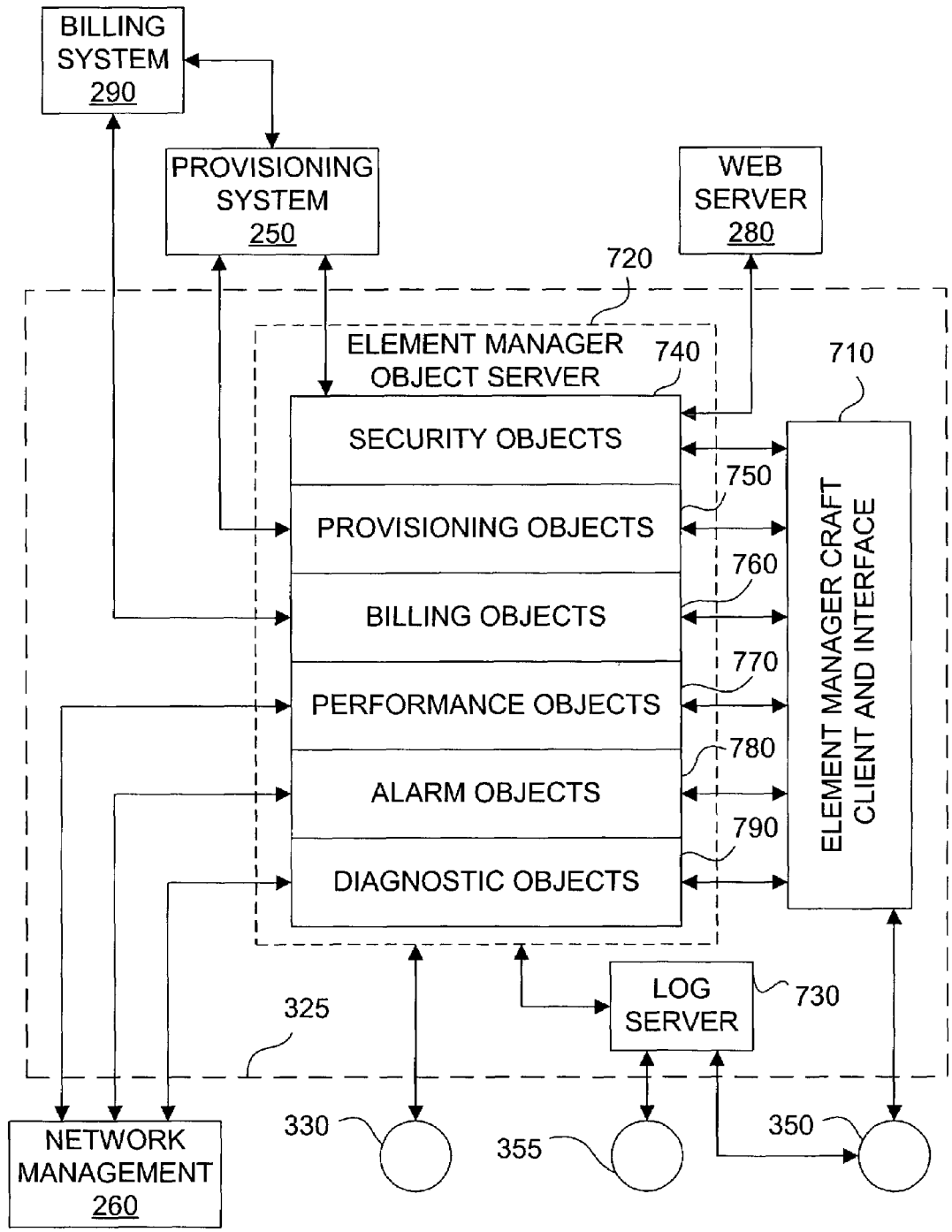
FIG. 7 is a block diagram showing the architecture of a fault, configuration, accounting, performance and security subsystem module.

FIG. 7 is a block diagram of FCAPS module 325. FCAPS module 325 includes an element manager craft client and interface 710, an element manager object server 720, and a log server 730.

Log server 730 receives information from connection logic control module 320 via local satellite processor 355. High priority information (alarms and call trace information) is immediately sent to element manager object server 720 and element manager craft client and interface 710. Log server 730 employs alarm stacks to keep track of all active alarms and additionally employs diagnostic stacks to keep track of call trace information. By contrast, medium priority information (performance and customer initiated diagnostic information) is not immediately sent to element manager object server 720, but is instead directed to either a performance stack or the diagnostic stack to await processing. Low priority information (system initiated diagnostic information and general logging information) is stored in a short term system log database of the log server 730 that maintains a log of all information (high, medium and low priority) and awaits processing when system activity is low.

Element manager craft interface 710 is an optional alternative to the provisioning system 250. Element manager craft client and interface 710 allows operations personnel, for example, to configure, diagnose, manually provision, and monitor the system. Since all system maintenance operations can be initiated from element manager craft interface 710, element manager craft interface 710 is able to interface with all of the objects hosted by element manager object server 720. The objects hosted by element manager object server 720 will be discussed more fully, below.

Element manager object server 720 allows secure access to log server 730, secure access to databases 240 through local satellite processor 330, and provides a common server for the various objects that perform many of the functions of FCAPS 325. Element manager object server 720 also gathers information about alarm and performance data and formats the information to be transmitted to network management system 260. The type of formatting that is required depends on the particular network management system 260 that is used. For example, if network management system 260 uses the Transaction Language One Protocol (TL1), all network management information is transmitted to network management system 260 via a TL1 ASCII (text) message. In those embodiments in which network management system 260 uses the Simple Network Management Protocol (SNMP), most network management information is stored in management information bases (MIB), with the exception of asynchronous alarms, which are sent to SNMP trap addresses.

The objects hosted by element manager object server 720 include security objects 740, provisioning objects 750, billing objects 760, performance objects 770, alarm objects 780, and diagnostics objects 790. Security objects 740 implement security policies that regulate the access of the element manager craft client and interface 710, web server 280, and provisioning system 250 to information in databases 240. Provisioning objects 750 allow data elements such as name, address, and subscribed services to be properly exposed to provisioning system 250 from the element manager craft client and interface 710. Likewise, billing objects 760 allow accounting data elements to be properly exposed to billing system 290. Similarly, performance objects 770 and alarm objects 780 expose various performance and alarm messages from log server 730 to network management system 260 and to element manager craft client and interface 710. Additionally, diagnostic objects 790 expose call trace and diagnostic information from log server 730 to the element manager craft client and interface 710.

Figure 8:
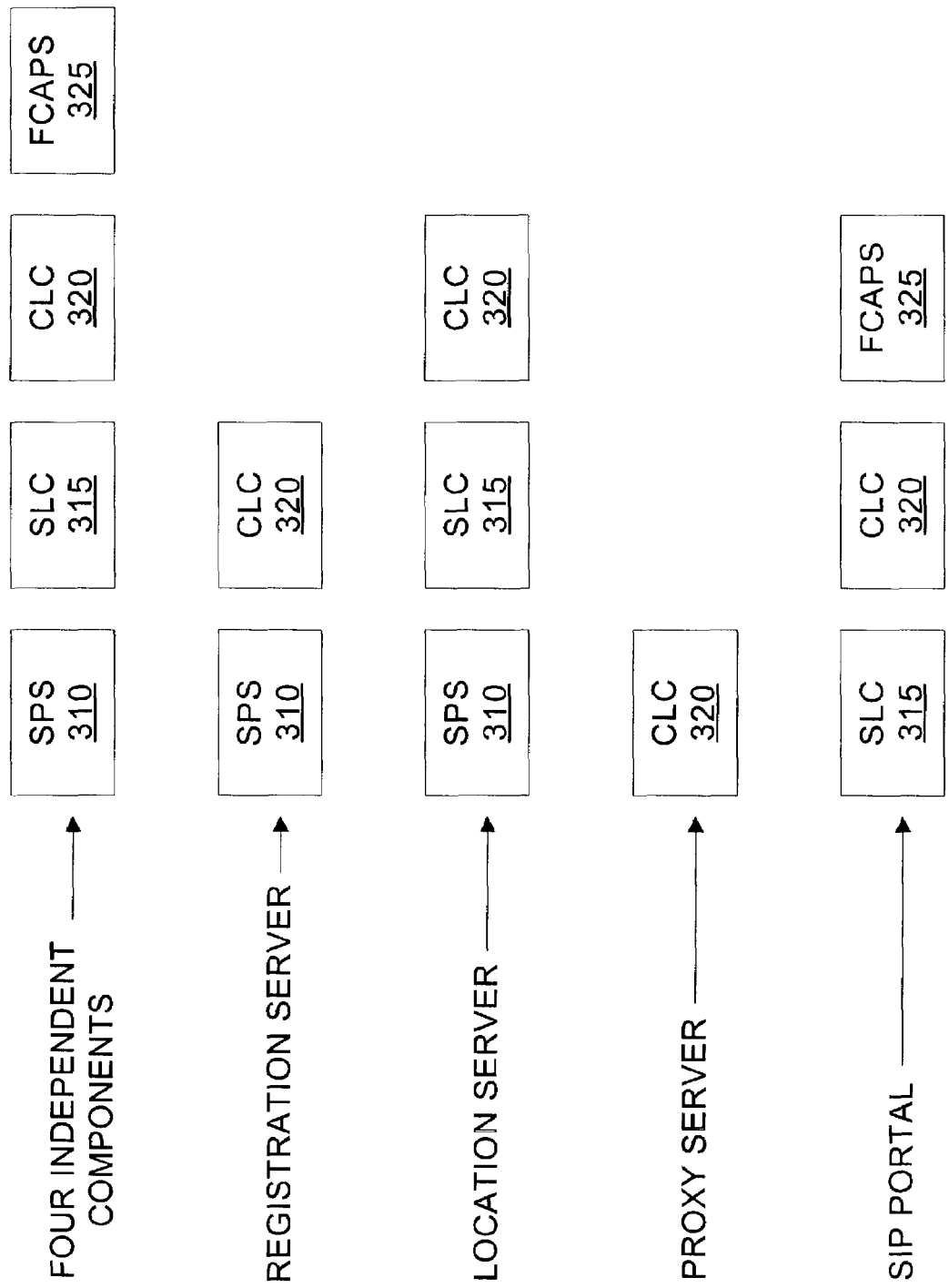
FIG. 8 is a block diagram showing the derivative devices made from the various modules.

FIG. 8 is a block diagram illustrating some derivative devices that can be realized using components of the MAP 210. As described above, the four major independent components of the MAP architecture 210 are the subscriber and policy service module 310, service logic control module 315, connection logic control module 320, and FCAPS module 325. However, in some embodiments it is desirable to utilize less than the full MAP 210 functionality, and in these embodiments the modules 310, 315, 320 and 325 are used in various combinations to create various derivative devices such as the ones discussed below.

For example, a registration server (used to register a subscriber and get a service) can be constructed by combining subscriber and policy service module 310 with a connection logic control module 320. Local satellite processors 330, 335, 345, and 355 allow subscriber and policy service module 310 and connection logic control module 320 to function without the other two modules 315 and 325.

During normal operation of MAP 210, local satellite processors 330, 335, 340, 345, 350, and 355 act as transparent conduits between modules 310, 315, 320 and 325. However, when service logic control module 315 and FCAPS module 325 are absent (or are not being used), the local satellite processors 330, 335, 345 and 355 intercept requests to these modules and either disregard them or send back dummy responses that do not effect the functionalities of the active modules 310 and 320. Therefore, MAP 210 can be converted into a registration server through merely the modification of local satellite processors 330, 335, 345 and 355, and without having to make changes to the active modules 310 and 320. It should be noted that in the registration server configuration the local satellite processor 340 between the active modules 310 and 320 is unchanged (transparent) and the local satellite processor 350 between the absent modules 315 and 325 is unused.

In a similar fashion, a location server (used to locate the destination party) is constructed by combining subscriber and policy service module 310, service logic control module 315 and connection logic control module 320. Only local satellite processors 330, 350 and 355 between the active modules 310, 315 and 320 and FCAPS module 325 are modified in the location server configuration.

By itself, connection logic control module 320 constitutes (i.e., emulates proxy secure functionality) a proxy server that sits between a client application and a real server (i.e., a dedicated physical or logical server). The proxy server intercepts all requests to the real server and fulfills any requests that it can. Requests that cannot be fulfilled by the connection logic control module 320 are forwarded to the real server. Modification of local satellite processors 340, 345 and 355 allow connection logic control module 320 to function in the absence of the other three modules 310, 315 and 325.

The addition of service logic control module 315 and FCAPS module 325 converts the proxy server into a SIP portal, allowing a signaling party to use any SIP enabled service and to be appropriately billed. The local satellite processors 330, 335 and 340 that connect the subscriber and policy service module 310 to the other systems are modified in the SIP portal configuration.

It will be apparent from the above examples that an additional benefit of local satellite processors 330, 335, 340, 345, 350 and 355 is that they allow for a decreased development time for MAP 210. The development time is decreased because the local satellite processors 330, 335, 340, 345, 350, and 355 separate modules 310, 315, 320, and 325 from one another which then allows the modules 310, 315, 320 and 325 to be developed and deployed independently.

In some embodiments, each of the local satellite processors 330, 335, 340, 345, 350, and 355 employ queues to send inputs to the various modules 310, 315, 320, and 325. Queuing allows different jobs to be lined up while waiting to be executed. Execution can proceed, for example, according to either the order in which the jobs were received by the queue, according to a priority system, or in a reverse order from which the jobs were received. Additionally, queuing allows modules 310, 315, 320 and 325 to suspend work on a single job while waiting for more information from other sources or other modules 310, 315, 320, and 325.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

We claim:

1. A device for enabling communications comprising:
    a connection logic control module including
        a Session Initiation Protocol (SIP) protocol driver;
        a SIP proxy engine coupled to the SIP protocol driver;
        a Quality of Service (QoS) policy manager coupled to the SIP proxy engine;
        a gate controller coupled to the SIP proxy engine; and
        a transaction state manager coupled to the SIP proxy engine;
    a subscriber and policy service module including
        a subscriber database;
        a locator module coupled to both the subscriber database and the SIP proxy engine;
        a directory service module coupled to the SIP proxy engine;
        an authentication module coupled to the SIP proxy engine
    a static locator module coupled to both the subscriber database and to the SIP proxy engine.

2. The device for enabling communications of claim 1, wherein the device is configured to operate as a proxy server.

3. The device for enabling communications of claim 1, wherein the SIP protocol driver is configured to provide connection control for a SIP device.

4. The device for enabling communications of claim 3, wherein the SIP protocol driver is configured to establish a connection in either Transmission Control Protocol or User Datagram Protocol.

5. The device for enabling communications of claim 3, wherein the SIP protocol driver is configured to convert a SIP message from a text format to a SIP object.

6. The device for enabling communications of claim 1, wherein the SIP proxy engine is configured to receive a SIP object and to execute a call logic.

7. The device for enabling communications of claim 1, wherein the QoS policy manager is configured to implement the QoS policy decision point requirements of the Internet Engineering Task Force.

8. The device for enabling communications of claim 1, wherein the gate controller is configured to determine whether to allow a connection.

9. The device for enabling communications of claim 1, wherein the gate controller is configured to provide security through a firewall.

10. The device for enabling communications of claim 1, wherein the gate controller is configured to provide security through a proxy function.

11. The device for enabling communications of claim 1, wherein the transaction state manager is configured to store a transaction record.

12. The device for enabling communications of claim 1, wherein the transaction state manager includes a database and a database management system.

13. The device for enabling communications of claim 1, wherein the device is configured to operate as a registration server.

14. The device for enabling communications of claim 1, wherein the subscriber and policy service module is coupled to the connection logic control module by a local satellite processor.

15. The device for enabling communications of claim 1, wherein the subscriber database stores subscriber information.

16. The device for enabling communications of claim 1, wherein the locator module is a static locator module.

17. The device for enabling communications of claim 1, wherein the locator module is a dynamic locator module.

18. The device for enabling communications of claim 1, wherein the directory service module is coupled to an external database.

19. The device for enabling communications of claim 1, wherein the directory service module is configured to update, search, perform lookups, and perform basic directory operations upon the external database.

20. The device for enabling communications of claim 1, wherein the directory service module is configured to use a Lightweight Directory Access Protocol.

21. The device for enabling communications of claim 1, wherein the authorization module is coupled to an external database.

22. The device for enabling communications of claim 1, wherein the authorization module is configured to accept an authentication request and to verify an identity of a signaling party.

23. The device for enabling communications of claim 1, wherein the subscriber and policy service module further includes an interface module configured to couple together the locator module, the directory service module, and the authorization module.

24. The device for enabling communications of claim 23, wherein the interface module is also coupled to a local satellite processor.

25. The device for enabling communications of claim 1, further comprising a service logic control module including
Parlay interfaces coupled to the SIP proxy engine; and
a location service engine coupled to the Parlay interfaces and to the SIP proxy engine.

26. The device for enabling communications of claim 25, wherein the device is configured to operate as a location server.

27. The device for enabling communications of claim 25, wherein the location service engine is coupled to the Parlay interfaces by a local satellite processor.

28. The device for enabling communications of claim 25, wherein the Parlay interfaces map a Parlay API Specification onto a SIP transaction model.

29. The device for enabling communications of claim 25, wherein the location service engine is made up of a state machine, java script, or CGI script to handle an individual transaction.

30. The device for enabling communications of claim 29, wherein the location service engine includes a Call Processing Language (CPL) service subsystem and an individual transaction is executed according to rules established in the CPL service subsystem.

31. The device for enabling communications of claim 30, wherein the location service engine further includes a call state services subsystem configured to maintain state information for the duration of a session.

32. The device for enabling communications of claim 25, wherein the location service engine further includes a feature services subsystem to provide support for a call feature code that is not recognizable as a caller address.

33. The device for enabling communications of claim 25, wherein the location service engine further includes an e-mail services subsystem to provide support for an e-mail notification.

34. The device for enabling communications of claim 25, wherein the location service engine further includes a paging services subsystem to provide support for a paging notification.

35. The device for enabling communications of claim 25, wherein the location service engine is configured to act as a SIP portal to an external service that is accessible with SIP.

36. The device for enabling communications of claim 1, further comprising
a service logic control module including
Parlay interfaces coupled to the SIP proxy engine, and
a location service engine coupled to the Parlay interfaces and to the SIP proxy engine; and
a Fault, Configuration, Accounting, Performance, and Security (FCAPS) module
including
a log server coupled to the connection logic control module;
an element manager object server coupled to the log server; and
an element manager craft client and interface coupled to both the log server and the element manager object server.

37. The device for enabling communications of claim 36, wherein the device is configured to operate as a SIP portal.

38. The device for enabling communications of claim 36, wherein the log server is coupled to the connection logic control module by a local satellite processor.

39. The device for enabling communications of claim 36, wherein the log server is configured to communicate high priority information to both the element manager object server and the element manager craft client and interface.

40. The device for enabling communications of claim 39, wherein the high priority information includes an alarm or a call trace.

41. The device for enabling communications of claim 36, wherein the log server includes a performance stack and a diagnostic stack.

42. The device for enabling communications of claim 41, wherein the log server is configured to direct medium priority information to either the performance stack or the diagnostic stack.

43. The device for enabling communications of claim 42, wherein the medium priority information includes performance or customer initiated diagnostic information.

44. The device for enabling communications of claim 36, wherein the log server includes a short term system log database that maintains a log of information including high priority information, medium priority information, or low priority information.

45. The device for enabling communications of claim 44, wherein the log server is configured to direct low priority information to the short term system log database.

46. The device for enabling communications of claim 45, wherein the low priority information includes system initiated diagnostic information or general logging information.

47. The device for enabling communications of claim 36, wherein the element manager craft client and interface is configured to allow an operations personnel to configure, diagnose, manually provision, or monitor the device.

48. The device for enabling communications of claim 36, wherein the element manager craft client and interface is configured to initiate a maintenance operation.

49. The device for enabling communications of claim 36, wherein the element manager object server is configured to allow secure access to an external database.

50. The device for enabling communications of claim 36, wherein the element manager object server is configured to gather information about performance or an alarm and to format the information to be transmitted to a network management system.

51. The device for enabling communications of claim 36, wherein the element manager object server is configured to host a security object implementing a security policy.

52. The device for enabling communications of claim 51, wherein the security policy regulates access of the element manager craft client and interface to information in an external database.

53. The device for enabling communications of claim 36, wherein the element manager object server is configured to host a provisioning object allowing a data element to be exposed to a provisioning system.

54. The device for enabling communications of claim 36, wherein the element manager object server is configured to host a billing object allowing an accounting data element to be exposed to a billing system.

55. The device for enabling communications of claim 36, wherein the element manager object server is configured to host a performance object exposing a performance message to a network management system.

56. The device for enabling communications of claim 36, wherein the element manager object server is configured to host an alarm object capable of exposing an alarm to the element manager craft client and interface.

57. The device for enabling communications of claim 36, wherein the element manager object server is configured to host a diagnostic object exposing call trace or diagnostic information to the element manager craft client and interface.

58. The device for enabling communication of claim 57, wherein each module is coupled to each of the other modules by a local satellite processor.

* * * * *